United States Patent [19]

Yang

[11] Patent Number: 5,624,347

[45] Date of Patent: Apr. 29, 1997

[54] ELECTRICAL MACHINE SYSTEM CAPABLE OF LOAD DRIVING AND POWER GENERATION FUNCTIONS AND INCLUDING AT LEAST TWO ELECTRICAL MECHINES

[76] Inventor: Tai-Her Yang, No. 32 Lane 29, Taipin St., Si-Hu Town, Dzan-Hwa, Taiwan

[21] Appl. No.: 320,405

[22] Filed: Oct. 3, 1994

[51] Int. Cl.$^6$ .............. B60K 41/02; B60K 1/00; B60K 6/00; F01C 13/00

[52] U.S. Cl. .............. 477/5; 180/65.2; 180/65.4; 290/4 C; 290/27

[58] Field of Search ................ 290/4 R, 4 C, 290/27, 28; 322/16, 39; 477/5, 2, 3; 180/65.2, 65.4

[56] References Cited

U.S. PATENT DOCUMENTS

| | | | |
|---|---|---|---|
| 1,980,656 | 11/1934 | Barnett | 290/27 |
| 2,538,119 | 1/1951 | Mironowicz | 322/16 |
| 3,227,941 | 1/1966 | Collamore | 322/16 |
| 4,310,140 | 1/1982 | Paschke | 290/4 C |
| 4,335,429 | 6/1982 | Kawakatsu | 180/65.2 X |
| 4,354,144 | 10/1982 | McCarthy | 477/5 X |
| 4,377,222 | 3/1983 | Sommer | 477/5 |
| 4,488,053 | 12/1984 | Cronin | 290/4 C |
| 5,125,469 | 6/1992 | Scott | 180/65.2 |
| 5,435,454 | 7/1995 | Farkas | 290/4 R |
| 5,476,293 | 12/1995 | Yang | 290/4 C |
| 5,492,189 | 2/1996 | Kriegler et al. | 180/65.2 |

FOREIGN PATENT DOCUMENTS

| | | | |
|---|---|---|---|
| 1160090 | 12/1963 | Germany | 290/27 |
| 309746 | 11/1955 | Switzerland | 180/65.2 |

*Primary Examiner*—Khoi Q. Ta
*Attorney, Agent, or Firm*—Bacon & Thomas

[57] ABSTRACT

An electrical machine system for driving a load and for providing power generating functions is made up of at least two electrical machines and a clutch controllable transmission. The two electrical machines are operatively connected by a clutch controllable transmission to obtain the following functions: 1.) the electrical machines can either drive the load individually or together; 2.) one of the electrical machines can be driven by the load feedback for power regeneration; and 3.) one of the electrical machines can be driven by an external power input to drive the other electrical machine as a generator for charging the battery or supply power to other loads. To achieve these functions, the transmission components can be in the form of one-directional or speed-responsive clutches, while the two electrical machines can be in the form either of two separate motor/generators, or dual windings of a single armature/field generator structure.

6 Claims, 1 Drawing Sheet

ELECTRICAL MACHINE SYSTEM CAPABLE OF LOAD DRIVING AND POWER GENERATION FUNCTIONS AND INCLUDING AT LEAST TWO ELECTRICAL MECHINES

SUMMARY OF THE INVENTION

An electrical machine system includes at least two electrical machines with the same or different electromechanical characteristics, and clutch controllable transmission components arranged to provide the system with the following operating functions:

1) The electrical machines can either drive the load individually or together;

2) One of the electrical machines can be driven by the load feedback for power regeneration;

3) One of the electrical machines can be driven by an external power input to deliver a rotational output for causing the other electrical machine to function as a generator and charge the battery or supply power to the other loads.

The clutch controllable transmission components include clutches, and in particular one-directional transmission clutches or speed responsive type clutches operated manually or by machine power, electromagnetic power or fluid power.

The system may be used in fixed mechanism applications, or translational mechanism applications such as in electrically motivated carriers, cars, boats, or track vehicles, and the electrical machines can be operated as required to function as a motor or to regenerate power in during braking process, or one of the electrical machines can be driven through an AC or DC power input at standstill to function as a generator to supply power to a load, for example to charge a battery.

DETAILED DESCRIPTION OF THE PREFERRED EMBODIMENTS

The system can be incorporated into different applications by selecting different clutch controllable transmission components.

Figure 1:
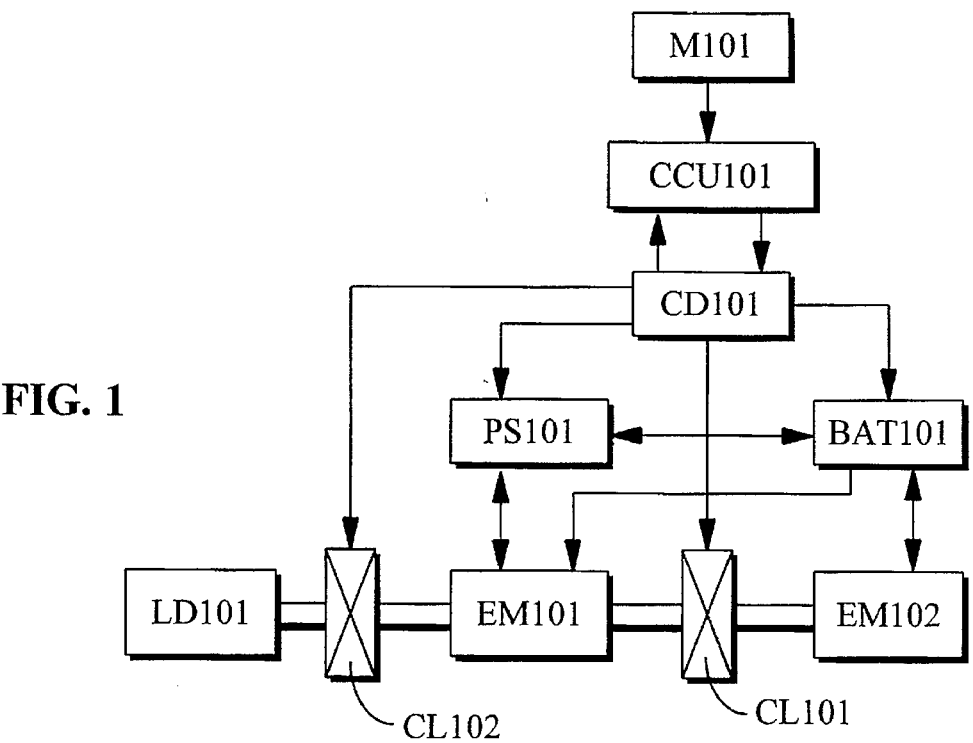
FIG. 1 is a schematic diagram illustrating the basic principles of the invention.

As illustrated in FIG. 1 the invention includes the following basic components:

The driving electrical machines EM101, EM102 include at least two coupled or compounded electrical machines which can be driven by AC or DC power. Each electrical machine can have the same or different electromechanical characteristics and at least one of them can be rotationally driven to generate power, wherein as a result of which the system can provide motor driving or power generation functions. The electrical machines can be series excited, shunt excited, or permanent magnet type electrical machines, electrical machines with hysteresis generation functions, or synchronous or asynchronous AC electrical machines functioning as driving motors.

The clutch controllable transmission components CL101, CL102 are made up of one or several of the following selected transmission components, including clutches such as one-directional transmission clutches or speed responsive type clutches operated manually or by machine power, electromagnetic power or fluid power. As illustrated, the coupling clutch CL101 is installed between the electrical machines EM101 and EM102, and the output clutch CL102 is installed between the load LD101 and the electrical machine EM101, although in practical applications, either one or both of the said clutches can be installed according to function requirements.

A power source PS101 in the form of an externally applied AC or DC power source is incorporated, according to the attributes of the electrical machine which converts the external power into mechanical rotation energy to rotationally drive one of the electrical machines and further to drive the other electrical machine as a generator to generate power.

A battery BAT101 stores and releases electrical energy to drive the load;

A drive controller CD101 is made up of electromagnetic and solid state electronic components to accept commands from a central controller CCU101 and control the electrical machines and the clutches to provide the following operating functions:

1) One of the electrical machines is driven by the external power input to drive the other electrical machine as a generator while the power generation rates and the battery charging rates are modulation controlled;

2) Some or all of the electrical machines are driven by the battery power to provide a mechanical output to drive the load;

3) The clutches are integrated with the operating status of the electrical machines to perform on/off operations.

The system embodiments based on the above functions can have the following applications:

1) One of the electrical machines is driven by the battery power input to drive the other electrical machine to operate as a DC generator;

2) Both the electrical machines EM101 and EM102 are driven by the battery power input to drive the load together;

3) Electrical machines EM101 and EM102 are driven by the battery power, but not simultaneously;

4) One of the electrical machines EM101 and EM102 is driven by the external input current to operate as a motor to rotationally drive the other electrical machine as a generator.

If both positive and reverse rotations are required for the selected application clutches CL101, CL102 are preferably in the form of speed responsive or other clutches operated manually or by machine power, electromagnetic power, or fluid power, such that if the electrical machine EM101 is operated as a motor through the battery power input, then the electrical machine EM101 has a slower rotation speed to drive the load, while if the electrical machine EM101 is driven by external power to drive electrical machine EM102 as a generator, then the rotation speed of electrical machine EM101 is always higher than the rotational speed of the motor driving output of the whole system, and a high speed centrifugal type clutch can be selected for the coupling clutch CL101 installed between electrical machines EM101 and EM102. Thus, electrical machine EM101 can be operated as a motor through the external power input to drive EM102 as a generator; or both electrical machines EM101 and EM102 or one of them are driven by the battery simultaneously to drive the load, with CL101 being closed at low speed and clutch CL102 being controlled by the operating commands to either open or close.

If the driving system only has a one-directional driving function, the output clutch CL102 can be selected from one-directional transmission clutches or speed responsive type clutches operated manually or by machine power, electromagnetic power or fluid power. For the output of electrical machine FM101 to the load, the clutch CL101 is embodied in a one directional clutch capable of rotation without driving the other electrical machine EM102, while if the electrical machine EM101 is reversely rotated, and the electrical machine EM102 is driven to operate as a generator for power generation, or both the electrical machines EM101 and EM102 are operated as motors to drive the load together, then the one-directional clutch is presented in a mutual power transmission. In addition, the coupling clutch CL101 installed between the electrical machines EM101 and EM102 can be selected from speed responsive or other clutches operated manually or by machine power, electromagnetic power, or fluid power, such that if the electrical machine is reversely driven by the load for power regeneration function, and the rotation speed of the electrical machine EM101 is always higher than the rotation speed of the motor driving output of the whole system, then a high speed centrifugal type clutch can also be selected for the clutch CL101.

The above said electrical machines can be embodied in a single electromechanical structure with a common magnetic field and an armature having double armature windings and double commutators to drive the load together, and having a controllable clutch installed between the electrical machine and the load such that when the clutch is released, one armature winding is driven by the external load, while the other armature winding is operated as a generator to charge the battery.

Figure 2:
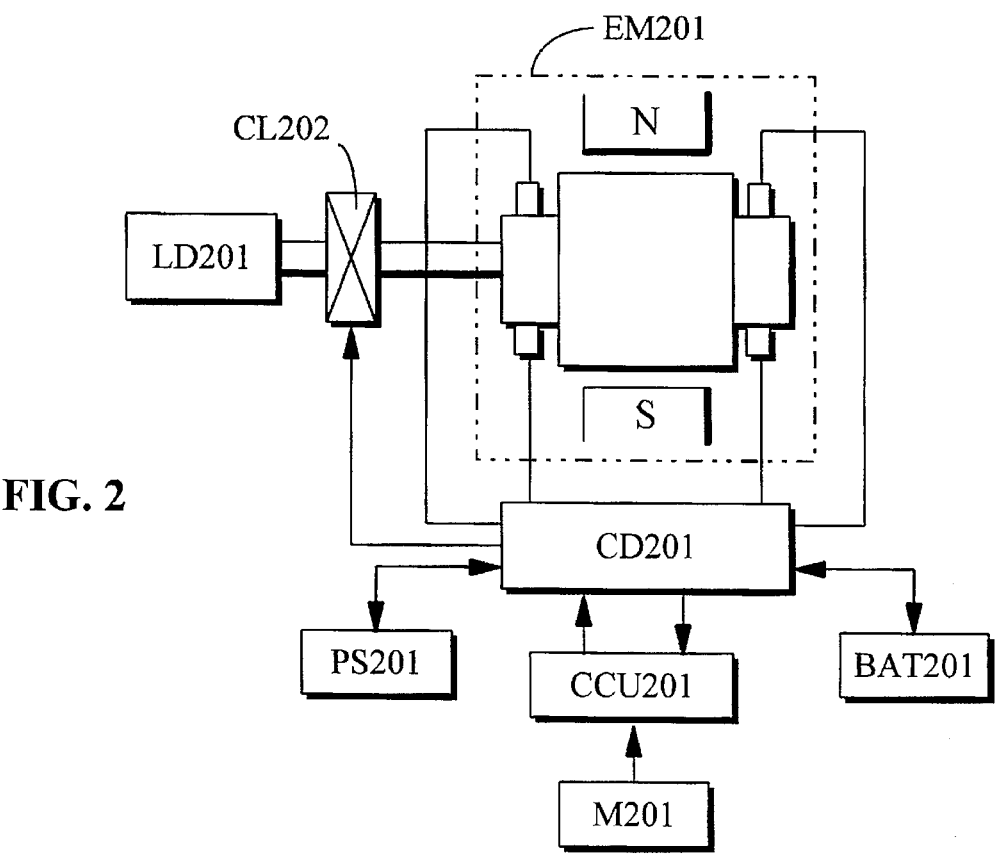
FIG. 2 is a block diagram of a preferred embodiment of the invention.

FIG. 2 illustrates an applied example of the common magnetic field embodiments, in which the electrical machine has double mutually insulated armature windings and commutators installed in the common magnetic field and is operated by the drive controller and the central controller, and to obtain the following functions:

1) The clutch CL202 is installed between the load LD201 and drive electrical machine EM201 such that when the clutch CL202 is closed, the two armature windings are operated in series or parallel to drive the load simultaneously from the battery power or drive the load by selecting one of the armature windings;

2) When the output clutch CL202 is opened, one of the armature windings is driven by external power to cause the other armature winding to generate electricity for charging the battery.

This embodiment includes the following principle elements:

An electrical machine EM201 is in the form of compounded electrical machine with two mutual insulated armature windings and commutators installed in a common magnetic field, in which one armature winding is controlled by a drive controller CD201 and central controller CCU201 to operate as a motor, while the other is operated as a generator;

The drive controller CD201 is made up of electromechanical or solid state electronic components arranges to receive commands from a central controller to control the rotation direction, rotation speed and loading current of the electrical machine EM201 driven by the battery power to function as a motor, or to control the charging voltage and current values of power provided to the battery in the case of power regeneration for energy recovery; or to drive one of the armatures by an external power input to synchronously drive the other armature winding to function as a generator to charge the battery and to regulate the charging rate as well as to control the output clutch CL202;

The central controller CCU201 is made up of electromechanical or solid state electronic components and is controlled by the operation setting device M201 to give corresponding signals to the drive controller CD201.

The operating setting device M201 is made up of electromechanical or solid sate electronic components for imputing commands to the central controller CCU201.

The output clutch CL202 can be selected from one-directional transmission clutches, speed responsive, or other clutches operated manually or by machine power, electromagnetic power, or fluid power.

A load LD201 in this embodiment provides mechanical load damping and is driven by the rotational energy of the electrical machine.

Power source PS201 is an externally applied AC or DC power source arranged to rotationally drive one of the electrical machines.

Battery BAT201 is provided for charging or discharging electricity.

In summary, the electrical machine system described above includes at least two compounded electrical machines with the same or different electromechanical characteristic properties, and arranged to perform a variety of operations while saving costs through elimination of the requirement to install additional generators by controlling the system via an operating setting device to operate as a motor to drive a load, or to drive one of the electrical machines by an external power input to function as a motor to drive the other electrical machine as a generator to charge the battery.

I claim:

1. An electrical machine system comprising:

two electrical machines;

means for causing one of the two electrical machines to drive a load individually;

means for causing the two electrical machines to drive the load together;

means for causing one of the two electrical machines to be driven by the load for power regeneration;

means for driving one of the electrical machines by an external power source to drive the other electrical machine as a generator and, when the other electrical machine is connected as a generator, for connecting the other electrical machine to a battery to charge the battery.

2. A system as claimed in claim 1, further comprising:

means for connecting one of the electrical machines to the battery to drive the other electrical machine to operate as a DC generator, and wherein:

said means for driving the load together comprises means for connecting both of the electrical machines to the battery to drive the load together;

said means for driving the load individually comprises means for connecting only one of the electrical machines to the battery; and said external power source is an external input current.

3. A system as claimed in claim 1, wherein the electrical machines are in the form of a single electromechanical structure comprising a common electromagnetic field generating structure and an armature having double armature windings and double commutators; and wherein a controllable clutch is installed between the electrical machine and the load such that when the clutch is released, one of the armature windings is driven by the external load, while the other armature winding is operated as a generator to charge a battery, and wherein 1.) a first clutch is installed between the load and the first electrical machine such that when the clutch is closed, the two armature windings are operated to drive the load simultaneously or drive the load by selecting one of the armature windings;

2.) when the output clutch is opened, one of the armature windings is driven by external power to drive the other armature to generate power for charging a battery.

4. An electrical machine system comprising:

two electrical machines;

means including a coupling clutch for selectively coupling and uncoupling the two electrical machines;

means including an output clutch for selectively coupling one of the two electrical machines to a lead;

first connecting means for connecting one of the two electrical machines to a battery;

second connecting means for connecting a second electrical machine to an external power input; and a drive controller for accepting commands from a central controller to control the electrical machines, the first and second connecting means, and the clutches based on an operating status of the electrical machines to provide a means for carrying out the following operating functions:

1.) connecting said external power input to the first of said electrical machines and causing said coupling clutch to couple said electrical machines together to drive the second of the electrical machines and cause it to generate power at modulation controlled rates;

2.) connecting one of said electrical machines to the battery and causing said output clutch to couple said one of said electrical machines to the lead to drive the lead individually;

3.) connecting both of said electrical machines to the battery, causing said coupling clutch to couple said two electrical machines together, and causing said output clutch to couple one of the two electrical machines to the lead to drive said lead together; and 4.) causing the first of the electrical machines to be driven by the load for power regeneration by releasing said coupling clutch means.

5. A system as claimed in claim 4, wherein the driving system is arranged to rotate in two directions, and wherein the output clutch is arranged such that when the first electrical machine is operated as a motor, the output clutch is engaged at slow speed to cause the first electrical machine to drive the load, and when the first electrical machine is operated at a higher speed, the coupling clutch is engaged to cause the first electrical machine to drive the second electrical machine as a generator.

6. A system as claimed in claim 1, wherein the driving system has only a single rotational direction output, and wherein the first clutch is a one-way clutch whose engagement depends on the direction of rotation of the first electrical machine.

* * * * *